United States Patent Office 3,037,951
Patented June 5, 1962

3,037,951
INTUMESCING, WATER RESISTANT FIRE RETARDANT COMPOSITIONS COMPRISING AT LEAST ONE WATER-INSOLUBLE METAL METAPHOSPHATE, A POLYPENTAERYTHRITOL, AND A WATER INSOLUBLE AMINOPLAST RESIN
Julio H. Basto, New York, N.Y., and Murray M. Capp, Whippany, Cyril R. Davison, Princeton, and George H. Garbaden, East Orange, N.J., assignors to Benjamin Moore & Co., New York, N.Y., a corporation of New Jersey
No Drawing. Filed July 21, 1959, Ser. No. 828,441
11 Claims. (Cl. 260—22)

The present invention relates to fire-retardant compositions, and is more particularly directed to potentially intumescing and intumescing fire-retardant compositions for the coating of combustible or heat-deformable substrates to protect such substrates from fire or heat, and, also, for coating a wide variety of substrates to prevent flame propagation.

Many solutions to the problem of fire-retardancy have heretofore been proposed. Recognizing that drapes, curtains and decorations upon ignition cause extreme heat for short durations but intense enough to ignite adjacent painted surfaces and cause the spread of flame, methods of treating these materials have been effective to some extent, but are not in universal use. Proposed solutions for fire-retardant coatings and compositions have embodied certain expedients to obtain fire retardancy; such as intumescence through the use of foam-producing materials, substitution of non-combustible materials, emission of non-flammable gas, and frequently a combination of all for maximum benefit. While several patents have been issued covering various approaches to the problem, public acceptance of the coatings contemplated thereby has been limited. It is believed that this is due in part to the failure of such known coatings to embody those properties which would make them serviceable. Thus, some of the known fire retarding coatings do not dry to a tack-free surface, or are so brittle as to chip off the surface to which they are applied, or are so rough and coarse in texture as to require recoating with conventional paints to obtain acceptable appearance, whereupon, much of the fire-retardant value is lost.

Among the further defects present in the existing fire-retardant coatings are: Deficient water resistance or excessive sensitivity to water which causes water-spotting and/or effervescence of materials on the surface of the coating thereby destroying the coating's decorative and protective values and tending to decrease its fire retardance; difficulty in applying the coating by means, such as by brush; excessively slow drying of the coating; lack of uniform cell size and cell distribution in the cellular mat formed by the coating when the latter is exposed to fire or extreme heat, that the coating is inefficient as a heat-insulating barrier, which is one essential or prerequisite of effective fire-retardance; lack of stability; and loss of fire and heat insulation upon aging or when film has been subject to heat.

An object of this invention is to provide a coating composition which is free of the above mentioned defects of existing coatings.

Another object of this invention is to provide a coating composition adapted to give fire-retardancy and latent heat insulation when applied to combustible and non-combustible materials.

Another object of this invention is to provide a coating composition which intumesces upon application of heat or flame.

A further object is to provide a composition to be applied, by conventional means, to unpainted and painted surfaces, and that will produce, upon drying, a decorative and serviceable fire-retarding film of acceptable appearance. Application may be made by brushing, roller coating, spraying, dipping, or any other conventional method.

A further object is to provide fire-retarding coating compositions made up of materials that are virtually insoluble in water and remain stable upon storage in suitable containers.

A further object of this invention is to provide a fire-retardant composition which forms coatings having excellent resistance to checking and cracking and also excellent resistance to washing and high humidity conditions without appreciable loss in fire-retardant properties.

A still further object of the present invention resides in the use of certain principles as well as materials for the binder as to give practical solutions to fire-retardancy and normal coating properties.

The products of our invention may be applied as a surface coating to objects or materials in general that are known as paintable surfaces. Combustible surfaces such as wood, cellulosic wallboard, plastic, paper, textiles, and non-combustible surfaces such as plaster, wallboard, and metals are representative of such paintable surfaces on which the coating will provide fire retarding and heat insulating properties.

While the compositions may be made in the form of a solid, paste or liquid in accordance with this invention, the liquid composition represents that which is normally used in painting practice.

Vast improvements in overcoming the defects described above and in achieving the above and related objects have been accomplished in accordance with the invention by a unique combination of materials, both organic and inorganic. The essential components of our improved fire-retardant composition comprise, in combination, at least a water insoluble metal metaphosphate salt, and a water insoluble polyol, but it is preferred to also include a water insoluble aminoplast.

INSOLUBLE METAL METAPHOSPHATE

Compounds such as ammonium phosphate, diammonium phosphate, phosphoric acid, ammonium sulfate, sulfamic acid, ammonium sulfamate, ammonium bromide, sodium tungstate, sodium borate, boric acid and urea phosphate have been utilized in various fire-retardant compositions, but these materials have the disadvantage of leaching out or washing out because of their water solubility. This makes for a much reduced fire-retardancy when these compositions are subjected to the action of water. The leaching or washing out of the specified materials may also impair the aesthetic properties of surfaces on which these fire-retardant compositions are used because of the streaks, water spots and deposits which are left on these surfaces by the action of water or water vapor, such as steam, and such surfaces are also less serviceable because washability is substantially reduced. The use of such compositions is prohibitive on surfaces where there is considerable water or possible water condensation.

To overcome these faults we have used the water insoluble metal metaphosphates. Examples of such salts are insoluble potassium metaphosphate, insoluble sodium metaphosphate, zinc metaphosphate and calcium metaphosphate. Other water insoluble metaphosphate salts are available and are applicable to this invention.

POLYOLS

Water insoluble polyhydric compounds may be used in the compositions of this invention. The polypentaerythritols are preferred in the compositions described herein. They may be employed in various polymeric forms, for example, as a dimer, trimer, etc. As specific examples of polypentaerythritols may be mentioned dipentaerythritol and tripentaerythritol and mixtures thereof.

AMINOPLASTS

The aminoplasts or amino aldehyde condensation products employed in the compositions of this invention are water insoluble and include a wide variety of materials which are prepared from aldehydes, organic compounds containing at least one and preferably two amino groups having at least two and preferably three replaceable hydrogen atoms.

The preferred aminoplasts for use in the compositions embodying this invention are the water insoluble urea-formaldehyde condensation products. The molecular ratio of formaldehyde to urea may be between 1 and 2.5 moles formaldehyde to 1 mole of urea. Such condensation products are used as a dry solid. The use of the alkylated modifications of such resins is likewise contemplated, particularly the butylated modifications of conventional area-formaldehyde and melamine formaldehyde resins. The butylated urea-formaldehydes are water insoluble and can be used as a solution without drying, if necessary.

As examples of other aminoplasts which are useful ingredients in our compositions of this invention may be mentioned the condensation products of an aldehyde with thiourea, guanidine, cyanamide, dicyandiamide and amino triazines having at least two amino groups as for example, melamine, 2-chloro-4,6 diamino-1,3,5 triazine, 2-hydroxy-4,6-diamino 1,3,5 triazine, alkyl guanamines, aryl guanamines and the like. In general the useful aminoplasts are prepared by partially condensing formaldehyde with amino compounds containing from 1 to 9 carbon atoms and having a grouping with the following general formula:

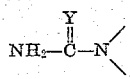

ing two free valences which represents a double band

Where N< is a member selected from the group consisting of a nitrogen atom having two single valences attached to separate hydrogen atoms, a nitrogen atom having two single valences attached to separate carbon atoms, and a nitrogen atom having two free valences which represent a double bond attached to a carbon atom; and where Y is a member selected from the group consisting of O, S, and a nitrogen atom having one free valence which is attached to a carbon or hydrogen atom. The condensation products may be formed by using sufficient formaldehyde to react with from at least one to all of the replaceable hydrogen atoms of the amino groups.

The aminoplasts may be prepared by using various aldehydes other than formaldehyde. Examples of these other aldehydes are acetaldehyde, propionaldehyde, furfural, glyoxal and the like. However, formaldehyde and water soluble polymers of formaldehyde, such as paraformaldehyde, give superior aminoplasts for the purposes of this invention and are therefore preferred.

In compositions embodying the invention, the amount of water insoluble polyol is between 28% and 200%, by weight, of the insoluble metal metaphosphate, if an aminoplast is not present, and between 10% and 200%, by weight, of the insoluble metal metaphosphate, when an aminoplast is included. Further, in the preferred three-component compositions, the amount of the insoluble metal metaphosphate is between 25% and 200% of the combined weight of the polyol and aminoplast.

The coatings formed from these compositions possess the property of intumescing when exposed to an open flame or to heat and do not appreciably lose this property even when the coating is washed with water periodically or exposed to high humidity conditions over the normal life of the coating. By "intumescing" is meant the property of frothing or puffing in such a manner as to produce a swollen solid cellular residue, which in itself is practically non-combustible. Such residue is sufficiently continuous and adherent to protect the substrate from combustion or the deleterious effects of heat and accomplishes this result by preventing access of air to the substrate and at the same time insulating the substrate from heat.

Compositions which contain a combination of the aminoplast, the water insoluble metal metaphosphate and the polypentaerythritol provide greater intumescence than is possible with a composition containing only the metaphosphate and polypentaerythritols. The coating is highly resistant to leaching with water. For example, a substrate coated with a composition according to the invention was submerged for 30 minutes in water and then dried overnight at room temperature. This coated substrate was then exposed to the direct flame of a Bunson Burner for 5 minutes, whereupon the coating intumesced to form a puffed char of substantially the same volume as was obtained with the same coating on a substrate that was not submerged in water.

In addition to the above mentioned essential components of compositions according to our invention, the latter may also include suitable pigments to provide a range of colors and covering power necessary in producing a suitable product, as well as inert pigment fillers, and additional fire-retarding agents, such as chlorinated paraffins, water insoluble organic phosphates, and chlorinated biphenyls, such as the aroclors and the like.

The compositions embodying the invention may also include a suitable vehicle, for example, a halogenated alkyd resin; thinners of the kind generally used in the coating industry to reduce the consistency of the coating or to promote a general solvency of the system, for example, aliphatic hydrocarbons such as mineral spirits, or aromatic hydrocarbons, such as, xylol, toluol and the like, or mixtures thereof; and driers of the kind usually employed in the art to promote drying of the coating or to aid in promoting the film forming properties, such as, salts of cobalt, manganese, lead, calcium and zinc metals.

The halogenated alkyd resin vehicle is prepared in the conventional way from halogenated dibasic acid, such as, tetrachlorophthalic anhydride, hexachloroendomethylene-tetrahydrophthalic acid and tetrabromophthalic anhydride; polyol, such as, glycerine and pentaerythritol; and an oxidizing oil, such as, soyabean oil, linseed oil and dehydrated castor oil, or a mixture of oxidizing and non-oxidizing oils, such as, castor oil and cottonseed oil, or the fatty acids of such oils.

The halogenated alkyd resin vehicle preferably contains 25 percent oil, by weight, but more or less oil may be included, although an increase in the amount of oil decreases the intumescence of the coating.

A further understanding of the invention will be obtained from the following specific examples which are intended to illustrate several of the most desirable compositions, but are not intended to limit the scope of this invention. It is to be noted that the parts and percentages given in the examples are by weight, unless otherwise specified.

Example I

| | Parts |
|---|---|
| Insoluble potassium metaphosphate | 40 |
| Dipentaerythritol | 20 |
| Aminoplast resin powder | 15 |
| Titanium dioxide | 17 |
| Antimony oxide | 10 |
| Halogenated alkyd resin | 30 |
| Thinner | 59 |
| Cobalt drier | 1 |

The aminoplast resin powder is prepared by reacting 1 mole of formaldehyde and 1 mole of urea.

The halogenated alkyd resin is prepared from dehydrated castor oil (representing 25% of total solids), glycerine and hexachloroendomethylenetetrahydrophthalic acid in accordance with the following procedure:

The glycerine and castor oil are introduced into a reaction kettle and heated to 212° F., whereupon the acid is added. The temperature is then raised slowly, in order to avoid foaming, to 370° F., at which temperature the oil, glycerine and acid are reacted in the presence of carbon dioxide to an acid number of 5 or less. The resulting alkyd resin is reduced with mineral spirits to a non-volatile of 56 percent.

The thinner consists of 80 percent mineral spirits (aliphatic hydrocarbon solvent) and 20 percent aromatic solvent. The mineral spirits may be the product which is available under the name Amsco Mineral Spirits from the American Mineral Spirits Company, while the aromatic solvent may be the product of the same company sold under the name Amsco G.

The drier is cobalt naphthenate having a metal content of 6 percent.

The paint is prepared in conventional paint making equipment. The ingredients are mixed in a paste mixer or other suitable equipment to produce a paste consistency. When a smooth resulting coating is desired, the resultant paste from the paste mixer or other equipment may be ground on a roller mill, a ball mill, high speed stone mill, or other types of mills.

The above paint is applied by conventional means to an unpainted or painted surface, and, upon drying produces a decorative and serviceable film of acceptable appearance.

This paint is comparable in stability to commercial paints.

*Example II*

| | Parts |
|---|---|
| Insoluble sodium metaphosphate | 40 |
| Tripentaerythritol | 20 |
| Titanium dioxide | 10 |
| Antimony oxide | 20 |
| Halogenated alkyd resin | 30 |
| Thinner | 47 |
| Cobalt drier | 1 |
| Lead drier | 2 |

The halogenated alkyd resin, thinner and cobalt drier in the above Example II are the same as those described in connection with Example I, while the lead drier is lead naphthenate having a metal content of 24 percent.

*Example III*

| | Parts |
|---|---|
| Calcium metaphosphate | 40 |
| Dipentaerythritol | 20 |
| Aminoplast | 20 |
| Titanium dioxide | 15 |
| Antimony oxide | 15 |
| Halogenated alkyd resin | 30 |
| Thinner | 53 |
| Manganese drier | 2 |

The aminoplast is prepared by reacting 2 moles of formaldehyde with 1 mole of urea.

The halogenated alkyd resin and thinner of Example III are the same as described in connection with Example I, while the manganese drier is manganese naphthenate having a metal content of 6 percent.

*Example IV*

| | Parts |
|---|---|
| Insoluble sodium metaphosphate | 40 |
| Tripentaerythritol | 40 |
| Aminoplast | 4 |
| Titanium dioxide | 10 |
| Antimony oxide | 22.5 |
| Halogenated alkyd resin | 30 |
| Thinner | 59 |
| Cobalt drier | 1 |

The aminoplast is prepared by reacting 1 mole of formaldehyde and 1 mole of urea.

The halogenated alkyd resin thinner and cobalt drier of Example IV are the same as described in connection with Example I.

*Example V*

| | Parts |
|---|---|
| Insoluble sodium metaphosphate | 40 |
| Tripentaerythritol | 20 |
| Aminoplast | 20 |
| Titanium dioxide | 25 |
| Halogenated alkyd resin | 30 |
| Thinner | 47 |
| Cobalt drier | 1 |
| Lead drier | 2 |

The aminoplast is prepared by reacting 1 mole of formaldehyde and 1 mole of urea.

The halogenated alkyd resin, thinner and cobalt drier of Example V are the same as described in connection with Example I, while the lead drier is the same as that in Example II.

*Example VI*

| | Parts |
|---|---|
| Insoluble sodium metaphosphate | 40 |
| Tripentaerythritol | 20 |
| Aminoplast | 20 |
| Halogenated alkyd resin | 30 |
| Thinner | 47 |
| Cobalt drier | 1 |
| Lead drier | 2 |

The aminoplast is prepared by reacting 1 mole of formaldehyde and 1 mole of urea.

The halogenated alkyd resin, thinner and driers of the above Example VI are the same as described in Example II.

*Example VII*

| | Parts |
|---|---|
| Insoluble sodium metaphosphate | 4 |
| Tripentaerythritol | 20 |
| Aminoplast | 20 |
| Antimony oxide | 17.5 |
| Titanium dioxide | 75 |
| Halogenated alkyd resin | 25 |
| Thinner | 40 |
| Manganese drier | 1 |
| Lead drier | 1.5 |

The aminoplast is prepared by reacting 2 moles of formaldehyde and 1 mole of urea.

The halogenated alkyd resin and thinner of Example VII are the same as described in Example I, while the lead drier is the same as described in Example II and the manganese drier is the same as in Example III.

The amount of insoluble metaphosphate can be reduced as above and still obtain intumescence. The intumescence is not as full or as much as in the other examples.

*Example VIII*

| | Parts |
|---|---|
| Insoluble sodium metaphosphate | 40.0 |
| Tripentaerythritol | 20.0 |
| Aminoplast resin | 20.0 |
| Antimony oxide | 20.0 |
| Titanium dioxide | 20.0 |
| Aqua ammonia (28% NH$_3$) | .8 |
| Sodium salt of carboxylated polyelectrolyte | .2 |
| Water dispersible lecithin | 2.4 |
| Water | 100.0 |
| Aqueous dispersion of halogenated alkyd resin | 131.5 |

The aminoplast resin is prepared from 1 mole of urea and 1 mole of formaldehyde.

The aqueous dispersion of halogenated alkyd resin is prepared by combining the following materials in the order given. Vigorous mechanical stirring should attend the incorporation of each component.

| | Parts |
|---|---|
| Halogenated alkyd resin | 72 |
| Cobalt drier | 1 |
| Iso-octyl phenyl poly ethoxyethanol | 6 |
| Sulfonated alkyl ester | 1.5 |
| Aqua ammonia (28% NH₃) | 1 |
| 1.5% aqueous solution of methyl cellulose, 4000 cps | 1.6 |
| Water | 34 |

The halogenated alkyd resin and the cobalt drier are the same as described in connection with Example I.

Sodium salt of carboxylated polyelectrolyte is obtainable as Tamol 731 (Rohm & Haas). Iso-octyl phenyl poly ethoxyethanol is obtainable as Triton X-100 (Rohm & Haas). Sulfonated alkyl ester is obtainable as Triton GR-5 (Rohm & Haas).

Other water dispersible resins or vehicles can be used with our composition besides the above described aqueous dispersion of halogenated alkyd resin.

*Example IX*

| | Parts |
|---|---|
| Zinc metaphosphate | 20 |
| Tripentaerythritol | 15 |
| Aminoplast resin | 30 |
| Antimony oxide | 20 |
| Titanium dioxide | 10 |
| Halogenated alkyd resin | 28 |
| Thinner | 52 |
| Cobalt drier | .5 |
| Manganese drier | .5 |

The aminoplast resin is prepared from 1 mole of urea and 1 mole of formaldehyde.

The halogenated alkyd resin, thinner and cobalt drier are the same as described in connection with Example I, while the manganese drier is the same as in Example III.

*Example X*

| | Parts |
|---|---|
| Insoluble sodium metaphosphate | 40 |
| Tripentaerythritol | 20 |
| Aminoplast | 20 |
| Barytes (barium sulfate pigment) | 20 |
| Titanium dioxide | 10 |
| Halogenated alkyd resin | 28 |
| Thinner | 52 |
| Cobalt drier | .5 |
| Manganese drier | .5 |

The aminoplast is prepared from 1 mole of urea and 1 mole of formaldehyde.

The halogenated alkyd resin, thinner and driers are the same as described in connection with Example IX.

While we have described several specific embodiments of our invention, it is to be understood that we do not wish to be limited thereto, as obviously various changes and modifications may be made therein without departing from the spirit and scope of the invention as defined in the appended claims.

What is claimed is:

1. An intumescing, water resistant, fire-retardant composition comprising at least one water-insoluble metal metaphosphate selected from the group consisting of zinc metaphosphate, calcium metaphosphate, insoluble sodium metaphosphate, insoluble potassium metaphosphate and insoluble potassium polymetaphosphate; a polypentaerythritol present in an amount between 10% and 200%, by weight, of said metal metaphosphate and being selected from the group consisting of dipentaerythritol, tripentaerythritol and mixtures thereof; and a water insoluble aminoplast resin which is the condensation product of an aldehyde and an amino compound containing from 1 to 9 carbon atoms and having the grouping

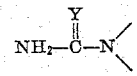

where N< is a member selected from the group consisting of a nitrogen atom having two single valences attached to separate atoms selected from the group consisting of hydrogen and carbon atoms, and a nitrogen atom having two free valences representing a double bond attached to a carbon atom; and where Y is a member selected from the group consisting of O, S, and a nitrogen atom with one free valence which is attached to an atom selected from the group consisting of hydrogen and carbon atoms; the weight of metal metaphosphate in said composition being between 25% and 200% of the combined weight of said polypentaerythritol and said aminoplast resin.

2. An intumescing, water-resistant, fire-retardant composition as in claim 1; wherein said aminoplast resin is selected from the group consisting of urea-formaldehyde and urea-paraformaldehyde condensation products, the butylated modifications of urea-formaldehyde and melamine-formaldehyde resins, and the condensation products of aldehydes with thiourea, guanidine, cyanamide, dicyandiamide and amino triazines having at least two amino groups.

3. A substrate coated on at least one surface thereof with a water resistant, intumescing fire-retardant coating comprising at least one water-insoluble metal metaphosphate selected from the group consisting of zinc metaphosphate, calcium metaphosphate, insoluble sodium metaphosphate, insoluble potassium metaphosphate and insoluble potassium polymetaphosphate; a polypentaerythritol present in an amount between 10% and 200%, by weight, of said metal metaphosphate, and being selected from the group consisting of dipentaerythritol, tripentaerythritol and mixtures thereof; a water insoluble aminoplast resin which is the condensation product of an aldehyde and an amino compound containing from 1 to 9 carbon atoms and having the grouping

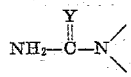

where N< is a member selected from the group consisting of a nitrogen atom having two single valences attached to separate atoms selected from the group consisting of hydrogen and carbon atoms, and a nitrogen atom having two free valences representing a double bond attached to a carbon atom; and where Y is a member selected from the group consisting of O, S, and a nitrogen atom with one free valence which is attached to an atom selected from the group consisting of hydrogen and carbon atoms; the weight of metal metaphosphate in said composition being between 25% and 200% of the combined weight of said polypentaerythritol and said aminoplast resin; and a binder.

4. A coated substrate as in claim 3; wherein said aminoplast resin is selected from the group consisting of urea-formaldehyde and urea-paraformaldehyde condensation products, the butylated modifications of urea-formaldehyde and melamine-formaldehyde resins, and the condensation products of aldehydes with thiourea, guanidine, cyanamide, dicyandiamide and amino triazines having at least two amino groups.

5. A coated substrate as in claim 4; wherein said binder is a halogenated alkyd resin which is the reaction product of a halogenated dibasic acid selected from the group consisting of tetrachlorophthalic anhydride, tetrabromophthalic anhydride and hexachloroendomethylenetetrahydrophthalic acid, a polyol selected from the group consisting of glycerine and polypentaerythritol, and a maximum of 25%, by weight, of vegetable oil.

6. An intumescing, water resistant, fire-retardant composition comprising at least one water-insoluble metal metaphosphate selected from the group consisting of zinc metaphosphate, calcium metaphosphate, insoluble sodium metaphosphate, insoluble potassium metaphosphate and insoluble potassium polymetaphosphate, and a polypentaerythritol selected from the group consisting of dipentaerythritol, tripentaerythritol and mixtures thereof, said polypentaerythritol being present in an amount between 38% and 200%, by weight, of said metal metaphosphate.

7. An intumescing, water resistant, fire-retardant composition as in claim 6; further comprising a halogenated alkyd resin which is the reaction product of a halogenated dibasic acid selected from the group consisting of tetrachlorophthalic anhydride, tetrabromophthalic anhydride and hexachloroendomethylenetetrahydrophthalic acid, a polyol selected from the group consisting of glycerine and polypentaerythritol, and a maximum of 25%, by weight, of vegetable oil.

8. An intumescing, water resistant, fire-retardant composition as in claim 7; wherein said halogenated alkyd resin is present as an aqueous dispersion thereof.

9. An intumescing, fire-retardant composition as in claim 6; further comprising urea-formaldehyde resin, the weight of said metal metaphosphate being between 25% and 200% of the combined weight of said polypentaerythritol and said urea-formaldehyde resin.

10. A substrate coated on at least one surface thereof with a water resistant, intumescing fire-retardant coating comprising at least one water-insoluble metal metaphosphate selected from the group consisting of zinc metaphosphate, calcium metaphosphate, insoluble sodium metaphosphate, insoluble potassium metaphosphate and insoluble potassium polymetaphosphate, a polypentaerythritol present in an amount between 38% and 200%, by weight, of said metal metaphosphate and being selected from the group consisting of dipentaerythritol, tripentaerythritol and mixtures thereof, and a binder formed by a halogenated alkyd resin which is the reaction product of a halogenated dibasic acid selected from the group consisting of tetrachlorophthalic anhydride, tetrabromophthalic anhydride and hexachloroendomethylenetetrahydrophthalic acid, a polyol selected from the group consisting of glycerine and polypentaerythritol, and a maximum of 25%, by weight, of vegetable oil.

11. A coated substrate as in claim 10; wherein said binder is an aqueous dispersion of said halogenated alkyd resin.

References Cited in the file of this patent
UNITED STATES PATENTS

| | | |
|---|---|---|
| 2,853,471 | Beadell | Sept. 23, 1958 |
| 2,877,204 | Duhnkrack et al. | Mar. 10, 1959 |
| 2,881,145 | Schmutzler | Apr. 7, 1959 |
| 2,912,393 | Stilbert et al. | Nov. 10, 1959 |
| 2,916,467 | Williams et al. | Dec. 8, 1959 |
| 2,941,894 | McAdow | June 21, 1960 |